United States Patent [19]

Wang

[11] Patent Number: 4,973,866
[45] Date of Patent: Nov. 27, 1990

[54] VARIABLE ANGLE STEPPER MOTOR
[75] Inventor: Ping-Shih Wang, Cheshire, Conn.
[73] Assignee: North American Philips Corporation, New York, N.Y.
[21] Appl. No.: 412,702
[22] Filed: Sep. 26, 1989
[51] Int. Cl.[5] .................... H02K 37/14; H02K 37/00
[52] U.S. Cl. ........................... 310/49 R; 310/156; 310/162
[58] Field of Search .............. 310/49 R, 152, 156, 310/162, 163, 164, 165

[56] References Cited

U.S. PATENT DOCUMENTS 4,274,026  6/1981  Haydon et al. ............... 310/49 R
4,803,389  2/1989  Ogawa et al. ............... 310/49 R

FOREIGN PATENT DOCUMENTS 0204460  11/1984  Japan ............................ 310/49 R Primary Examiner—Steven L. Stephan
Assistant Examiner—Judson H. Jones
Attorney, Agent, or Firm—Robert J. Kraus

[57] ABSTRACT

A stepper motor having a permanent magnet rotor rotatably mounted within the annuli of a stator winding and a bias magnet. When the stator winding is not energized, the rotor assumes a home position established by the bias magnet. When the stator winding is energized, the rotor is rotated away from the home position by an angular displacement determined by the winding current.

8 Claims, 4 Drawing Sheets

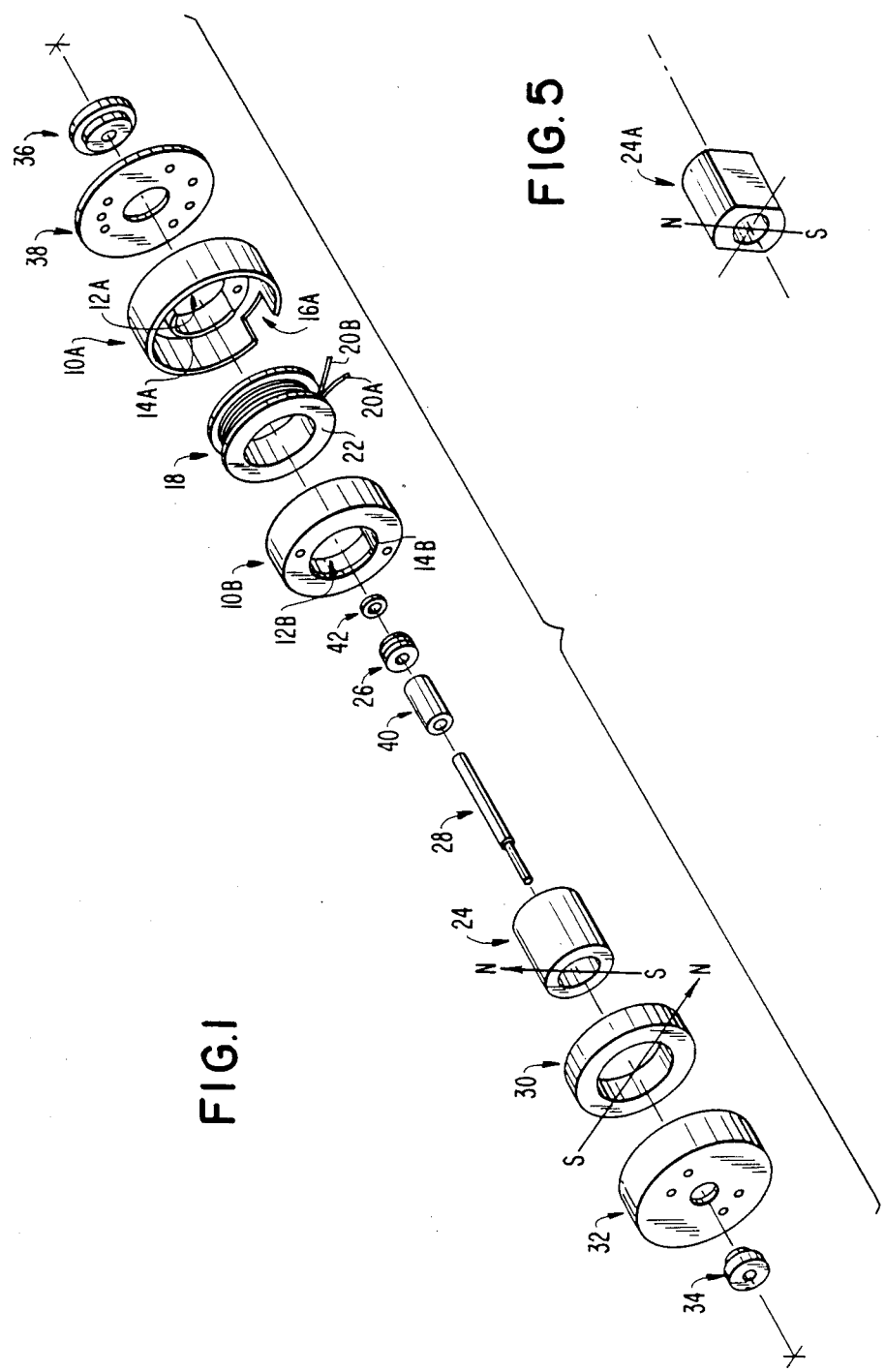
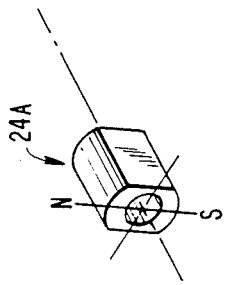

VARIABLE ANGLE STEPPER MOTOR

BACKGROUND OF THE INVENTION

1. Field of the Invention

This invention relates to a permanent magnet stepper motor, and in particular to such a motor for controllably moving a rotor to variable angle rotational positions.

2. Description of Related Art

A stepper motor is a versatile device having many different uses. For example, a stepper motor can be operated as a synchronous motor powered by pulses of electrical current in such applications as clocks, meters, timing devices and recorders. Such a motor can also be pulsed at will to effect predetermined increments of movement of elements such as print heads and paper feeders in printers. A stepper motor can also be pulsed at variable speeds to drive apparatus such as a pump which must be operated at variable flow rates.

A typical permanent magnet stepper motor is a one or two phase device comprising a rotor disposed for rotation around a central axis within an annular stator. The rotor includes around its circumference a permanently magnetized region which successively forms a number of North-South pole pairs. The stator includes first and second joined field cups for each phase, each containing a winding of insulated wire surrounding a plurality of magnetizable pole pieces corresponding in number to the magnetic poles in the rotor.

For each phase, the pole pieces of the first field cup are angularly displaced from those of the second field cup to effect a rotational force on the rotor when electrical current is passed through the windings. By controlling the timing and polarities of current pulses passed through the windings, the rotor can be controllably stepped through discrete rotational movements. Further details of typical stepper motor structure, operation and drive circuity can be obtained from a publication entitled AIRPAX Stepper Motor Handbook published by Airpax Corporation, 604 West Johnson Avenue, P.O. Box 590, Cheshire, CT, U.S.A.

One limitation of conventional single phase stepper motors is their inability to vary the rotational positions to which the rotor is stepped. Both the direction and the speed of rotation of the rotor are electrically controllable, but the discrete rotational positions to which the rotor can be positioned are fixed by the positions of the stator pole pieces. In some applications, it is desirable to electrically control the angular separation between the positions to which the rotor can be rotated, as well as the speed and direction of rotation. This capability would enable the user to electrically adjust the angle of rotation to match his needs and to change the angle at will. Some examples of such applications are motors for powering scanner mirrors in laser scanner devices and for powering strip chart recorders.

SUMMARY OF THE INVENTION

It is an object of the invention to provide a stepper motor in which the rotor can be rotated to selectable positions by passing respective predetermined currents through a stator winding.

It is another object of the invention to provide a stepper motor in which at least one of the selectable positions can be varied by varying the magnitude of the respective stator winding current.

It is yet another object of the invention to provide a stepper motor in which the angle of rotation separating selectable rotor positions is a function of the stator current.

In accordance with the invention, a variable angle stepper motor comprises a stator, a permanent magnet rotor and bias magnet means. The stator defines an orifice having a central axis and includes first and second pole pieces of magnetically permeable material disposed adjacent different sectors of a peripheral region of the orifice. An electrically conductive winding is arranged in the stator for inducing magnetic North and South poles in the first and second pole pieces.

The permanent magnet rotor is mounted for rotation around the axis and has a first portion disposed within the stator orifice in proximity to the pole pieces and a second portion extending out of the stator orifice. The rotor is magnetized such that it has a North pole in a first sector thereof and a South pole in a second sector thereof.

The bias magnet means is disposed around the axis adjacent the second portion of the rotor and is magnetized such that it has a North pole in a first sector thereof and a South pole in a second sector thereof. Both the magnetic field strength and the angular positions of the North-South poles are predetermined to predictably influence the rotational position of the rotor and to make the position dependent on the magnitude of the electric current passing through the winding.

In one particularly advantageous embodiment of the invention, the magnetic fields produced by the stator, the rotor and the bias magnet each have only one North-South pole pair, and the bias magnet is oriented relative to the stator such that their respective poles are angularly separated by 90 degrees.

In a preferred form of the invention, the stator includes first and second cup shaped members of magnetically permeable material each having a central opening substantially coextensive with the orifice. The first and second pole pieces are formed by respective arcuate portions of the cup shaped members which are disposed adjacent different sectors of a peripheral region of the orifice. The members are dimensioned and fitted together to form an annular space surrounding the pole pieces and to form a magnetic field gap between the pole pieces. The stator winding is arranged within the annular space for inducing magnetic North and South poles in the first and second pole pieces, respectively, when an electric current is passed through the winding in a first direction, and for inducing opposite poles in the pole pieces when the current is passed through the winding in the opposite direction.

BRIEF DESCRIPTION OF THE DRAWING

FIG. 1 is an exploded view of a stepper motor in accordance with the invention, showing the arrangement of the parts of the motor along a central axis X—X;

FIG. 5 is an illustration of an alternative part which can be used in the stepper motor of FIG. 1.

DESCRIPTION OF THE PREFERRED EMBODIMENTS

Figure 2:
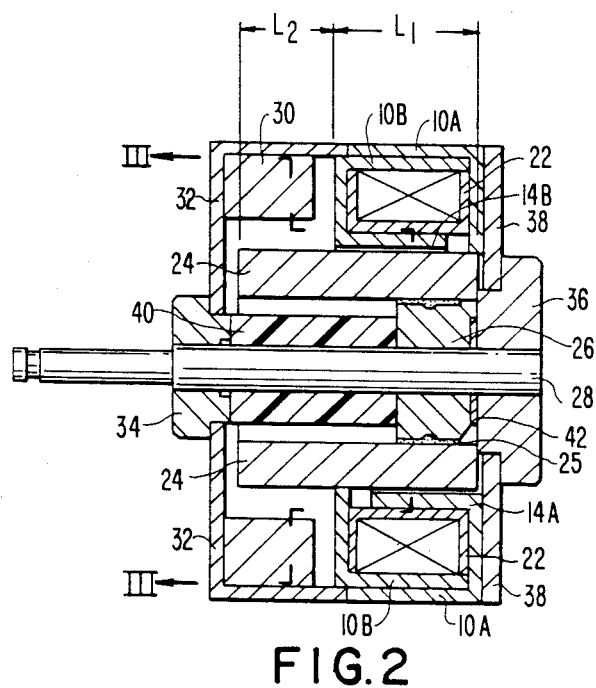
FIG. 2 is a sectional view of the stepper motor of FIG. 1, formed by cutting the motor with a plane containing the central axis X—X.
Figure 3A:
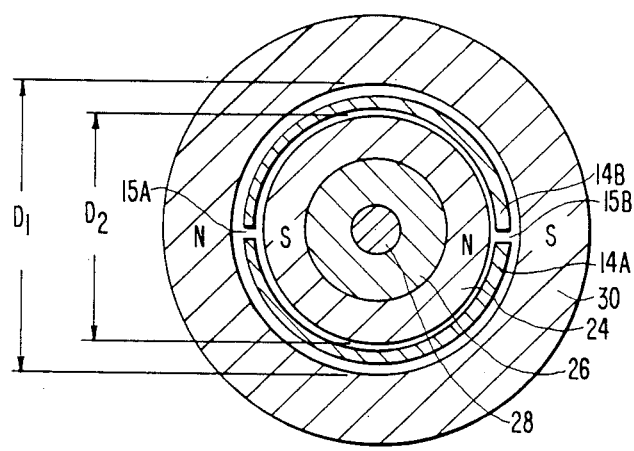
FIGS. 3a, 3b and 3c are sectional views of the stepper motor taken along the line III–III of FIG. 2, each view showing the rotor position during a different mode of stator energization.

By referring to FIGS. 1, 2 and 3a together, which are drawn substantially to scale, the assembly and construction of a preferred embodiment of the variable angle stepper motor can be readily understood.

All of the parts of the stepper motor are arranged along and centered on the central axis X—X. An outer field cup 10A and an inner field cup 10B disposed within the outer cup collectively form a stator housing at one end of the motor. Alternatively the field cups could be joined at abutting edges, but the arrangement shown in the drawing is simpler to assemble. The field cups are stamped or otherwise made from a magnetically permeable material, such as cold rolled steel, and include respective central openings 12A, 12B and respective arcuate portions forming pole pieces 14A, 14B. The field cups also include aligned notches, of which only one (16A) is visible in FIG. 1. In the assembled stator housing, these notches define an opening for wire leads of a stator winding.

As can be best seen from FIG. 3a, the pole pieces 14A, 14B each extend through an arc of slightly less than 180 degrees, are in opposite sectors of the illustrated circular cross section, and are separated by gaps 15A, 15B. These pole pieces, together with peripheral and side walls of the outer and inner field cups, define a substantially closed annular space in which a stator winding 18 is disposed. This winding comprises a coil of insulated electrical wire, such as magnet wire, terminating in leads 20A, 20B wound around a bobbin 22 of electrically insulating material such as nylon. These leads extend through the stator housing opening defined by the notches 16A (shown) and 16B (not shown).

The rotor of the stepper motor comprises an elongate annular part 24 of a permanently magnetized material such as ferrite or alnico, which is affixed to a hub 26 of a nonmagnetic material, such as aluminum, by means of an epoxy 25. The hub 26 is affixed to a nonmagnetic stainless steel shaft 28 by means of an adhesive or press fit. The permanently magnetized annular part 24 has a single North pole and a single South pole, which are located in diametrically opposite sectors of the previously mentioned circular cross section. As indicated by the arrow passing through part 24, the magnetic field lines at the poles extend radially from the poles.

For reasons which will become apparent, the axial length of the annular part 24 is substantially longer than that of the stator housing formed by the field cups 10A, 10B. As is illustrated in FIG. 2, a length $L_1$ of the annular part is contained within an orifice of the stator housing defined by the arcuate pole pieces 14A, 14B of the field cups. The remainder of the annular part, having a length $L_2$, extends out of the stator housing and is surrounded by an annular bias magnet 30 which is affixed to an inner surface of the mounting cup 32 by means of an adhesive or a press fit. The mounting cup has a peripheral edge which abuts a corresponding edge of the outer field cup 10A and surrounds a peripheral portion of the inner field cup 10B. Depending on whether magnetic shielding is desired, the mounting cup may be manufactured from a magnetic material, such as cold rolled steel, or from a nonmagnetic material, such as aluminum or plastic.

The bias magnet 30 is formed of a permanently magnetized material, such as ferrite or alnico, and has an inner diameter $D_1$ which is substantially larger than the outer diameter $D_2$ of the annular part 24 (see FIG. 3a). The bias magnet has a single North pole and a single South pole which are located in diametrically opposite sectors of the illustrated cross section and are disposed adjacent respective ones of the gaps 15A, 15B. As indicated by the arrow passing through the bias magnet, the magnetic field lines at the poles extend radially from the poles.

The rotor is rotatably mounted in the stepper motor by means of sintered bronze bearings 34, 36 into which opposite ends of the shaft 28 extend. Bearing 34 is mounted in a central opening in the mounting cup 32 and bearing 36 is mounted in a central opening in a disc shaped mounting plate 38 of any rigid material. Typically, the mounting plate is made of cold rolled steel and is affixed to an end surface of the outer field cup 10A by means of staking, spot welding or riveting. A plastic spacer 40 and a washer 42, preferably of nonmagnetic material such as a plastic or stainless steel, are disposed on the shaft 28 on opposite sides of the hub 26 to axially position the annular part 24 within the motor and to prevent opposite ends of the annular part from rubbing against other parts of the motor.

Figure 3B:
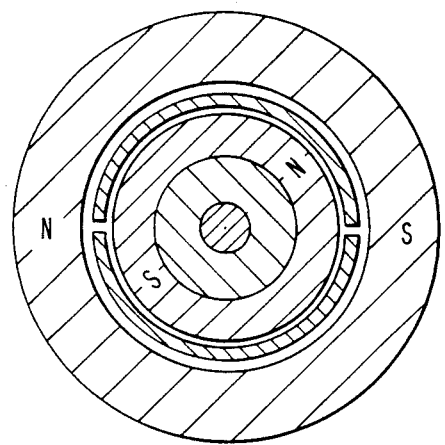
Figure 3C:
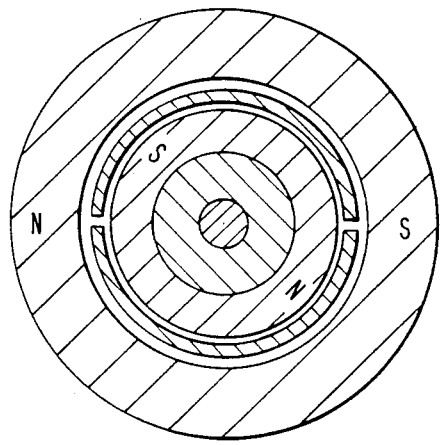
Figure 4A:
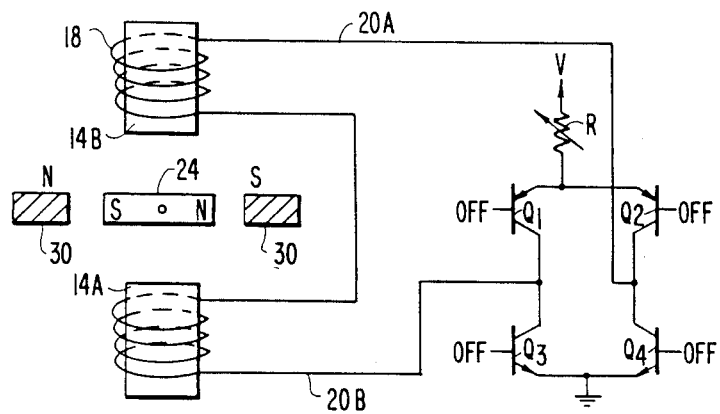
FIGS. 4a, 4b and 4c are schematic representations of the different modes of stator energization for which the rotor positions in FIGS. 3a, 3b and 3c result.
Figure 4B:
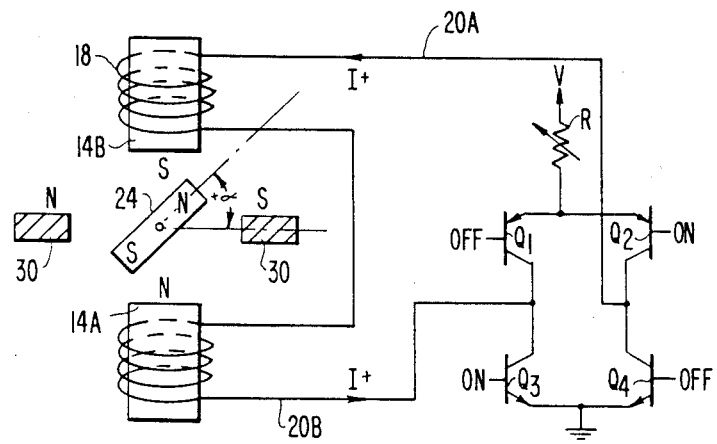
Figure 4C:
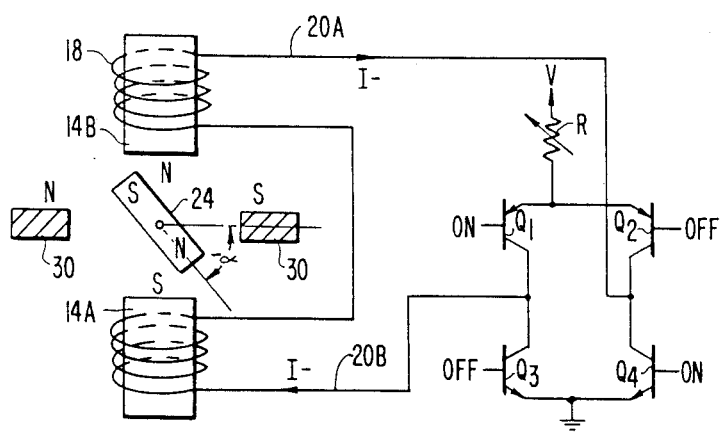

Operation of the stepper motor can be best understood by referring to FIGS. 2, 3 and 4. FIG. 2 shows the structural interrelationship of the electromagnetic parts of the motor. FIGS. 3a, 3b, 3c physically illustrate the rotational position of the rotor for three different electromagnetic conditions. Corresponding FIGS. 4a, 4b, 4c schematically illustrate the operation of a stator winding drive circuit for the three conditions. This drive circuit includes four transistors Q1, Q2, Q3, Q4 which are electrically connected to the leads 20A, 20B of the winding.

In the first condition, represented by FIGS. 3a and 4a, all of the transistors are biased OFF (in a non-conducting state) and no current passes through the stator winding 18. No magnetic field is induced in the stator field cups 10A, 10B, and the position of the rotor is determined solely by the magnetic fields permanently produced by the annular rotor part 24 and the annular bias magnet 30. As is illustrated, the North and South poles of the rotor part align with the opposite polarity South and North poles, respectively, of the bias magnet.

In the second condition, represented by FIGS. 3b and 4b, transistors Q1, Q4 are biased OFF, transistors Q2, Q3 are biased ON (in a saturated, fully conducting state) and a current I+ passes through the stator winding 18 in the direction indicated by the arrowheads. The current I+ passing through the winding induces in the stator field cups a magnetic field having North and South poles in the pole pieces 14A and 14B, respectively. The attractive force of the induced poles causes the rotor to rotate to an equilibrium position at an angle $+\alpha$ where the rotor North pole is disposed at an intermediate position between the stator pole piece 14B and the unchanging South pole of the bias magnet 30. This angle can be adjusted to any desired value from near 0 degrees to almost 90 degrees by simply adjusting the magnitude of the current I+ In the illustrated embodiment, this could be done by adjusting the resistance of a variable resistor R which is electrically connected in series with the transistor circuit and a constant source of potential V.

In the third condition, represented by FIGS. 3c and 4c, transistors Q1 and Q4 are biased ON, transistors Q2 and Q3 are biased OFF, and a current I⁻ passes through the stator winding 18 in the opposite direction, as indicated by the arrowheads. The current I⁻ passing through the winding induces in the stator field cups a magnetic field having North and South poles in the stator pole pieces 14B and 14A, respectively. Now, the attractive force of the induced poles causes the rotor to rotate to an equilibrium position at an angle $-\alpha$ where the rotor North pole is disposed at an intermediate position between the stator pole piece 14A and the unchanging South pole of the bias magnet 30. This angle can be adjusted to any desired value from near 0 degrees to almost $-90$ degrees by simply adjusting the magnitude of the current I⁻, again by adjusting the resistance R. This adjustment will also affect the angle $+\alpha$, unless an alternative circuit arrangement is utilized which provides separate adjustments for the two currents.

The above described stepper motor is merely illustrative of one embodiment of the invention, and many alternative forms and variations are possible. For example, the drive circuit illustrated in FIG. 4 could be replaced with a circuit which selectively passes through the stator winding a plurality of different current magnitudes. By choosing the current magnitudes to correspond to predetermined angular positions, the circuit could be utilized to controllably step the rotor to the positions.

In another alternative embodiment, the annular rotor part 24 is replaced with a bar magnet part 24A, as illustrated in FIG. 5. Part 24A is generally rectangular in cross section, but has two curved diametrically opposed surfaces with radii corresponding to that of the circular outer surface of part 24. In comparison to an annular part, such a bar magnet part can be more precisely magnetized in predefined polar sectors. However, a larger number of pole pairs can be provided in an annular part. In this regard, note that either or both of the annular rotor part 24 and the bias magnet 30 may be provided with a plurality of pole pairs.

It might also be desirable to add one or more mechanical stops to the motor to limit angular movement and prevent overshoot of the shaft beyond predetermined angular limits. Such a feature could be added to protect an apparatus powered by the shaft in the event the winding is improperly driven.

I claim:
1. A variable angle stepper motor comprising:
   a. a stator defining an orifice having a central axis and including:
      (1) first and second pole pieces of magnetically permeable material disposed adjacent different sectors of a peripheral region of the orifice;
      (2) an electrically conductive winding arranged for inducing magnetic North and South poles in the first and second pole pieces, respectively, when an electric current is passed through the winding;
   b. a permanent magnet rotor mounted for rotation around the axis and having a first portion disposed within the stator orifice in proximity to the pole pieces and a second portion extending out of the stator orifice, said rotor having a magnetic North pole in a first sector thereof and a magnetic South pole in a second sector thereof; and
   c. bias magnet means disposed around the axis adjacent the second portion of the rotor and having a magnetic North pole in a first sector thereof and a magnetic South pole in a second sector thereof, said bias magnet means having a predetermined magnetic field strength and predetermined angular positions of the North and South poles for predictably influencing the rotational position of the rotor and making said rotor position dependent on the magnitude of the electric current passing through the winding.

2. A variable angle stepper motor as in claim 1 where the orifice is located in a region substantially surrounded by the pole pieces.

3. A variable angle stepper motor as in claim 1 where the stator has only two of said pole pieces and where the rotor and the bias magnet means each have only one North-South pole pair.

4. A variable angle stepper motor as in claim 1 where the bias magnet means is oriented relative to the stator such that the North pole induced in said first pole piece is angularly separated by ninety degrees from the North pole in the first sector of the bias magnet means.

5. A variable angle stepper motor comprising:
   a. a stator defining an orifice having a central axis and including:
      (1) first and second cup shaped members of magnetically permeable material, each member having a central opening substantially coextensive with the orifice and having respective arcuate portions defining first and second pole pieces disposed adjacent different sectors of a peripheral region of the orifice, said cup shaped members being dimensioned and fitted together to form an annular space surrounding the pole pieces and to form a magnetic field gap between the first and second pole pieces;
      (2) an electrically conductive winding arranged within the annular space for inducing magnetic North and South poles in the first and second pole pieces, respectively, when an electric current is passed through the winding in a first direction and for inducing magnetic South and North poles in the first and second pole pieces, respectively, when an electric current is passed through the winding in a second direction opposite to said first direction;
   b. a rotor mounted for rotation around the axis and including an elongate permanently magnetized annular part having a first portion disposed within the stator orifice in proximity to the pole pieces and a second portion extending out of the stator orifice, said annular part having a magnetic North pole in a first sector thereof and a magnetic South pole in a second sector thereof; and
   c. an annular bias magnet disposed around the second portion of the permanently magnetized annular part of the rotor and having a magnetic North pole in a first sector thereof and a magnetic South pole in a second sector thereof, said bias magnet having a predetermined magnetic field strength and predetermined angular positions of the North and South poles for predictably influencing the rotational position of the rotor and making said rotor position dependent on the direction and magnitude of the electric current passing through the winding.

6. A variable angle stepper motor as in claim 5 where the stator has only two of said pole pieces and where the rotor and the annular bias magnet each have only one North-South pole pair.

7. A variable angle stepper motor as in claim 5 where the annular bias magnet is oriented relative to the stator such that the North pole induced in said first pole piece is angularly separated by ninety degrees from the North pole in the first sector of the annular bias magnet.

8. A variable angle stepper motor as in claim 5 where one of said first and second cup shaped members is disposed within the other.

* * * * *